(12) United States Patent
Yagi et al.

(10) Patent No.: US 7,041,726 B2
(45) Date of Patent: May 9, 2006

(54) INSULATING MEMBER USING ABRASION-RESISTANT RESIN COMPOSITION

(75) Inventors: Kiyoshi Yagi, Susono (JP); Makoto Katsumata, Susono (JP); Hitoshi Ushijima, Susono (JP); Shinichi Watanabe, Susono (JP)

(73) Assignee: Yazaki Corporation, Tokyo (JP)

( * ) Notice: Subject to any disclaimer, the term of this patent is extended or adjusted under 35 U.S.C. 154(b) by 58 days.

(21) Appl. No.: 10/693,932

(22) Filed: Oct. 28, 2003

(65) Prior Publication Data

US 2004/0087705 A1 May 6, 2004

(30) Foreign Application Priority Data

Oct. 29, 2002 (JP) ............................ P2002-314844

(51) Int. Cl.
*C08K 3/36* (2006.01)
*C08L 23/00* (2006.01)

(52) U.S. Cl. ........................ 524/514; 524/261; 524/265

(58) Field of Classification Search ................ 524/514, 524/261, 265
See application file for complete search history.

(56) References Cited

FOREIGN PATENT DOCUMENTS

| JP | 3-279419 A | 12/1991 |
|---|---|---|
| JP | 4-272222 A | 9/1992 |
| JP | 4-281015 A | 10/1992 |
| JP | 11-106570 A | 4/1999 |
| JP | 11-302464 A | 11/1999 |
| WO | WO 99/48973 A1 | 9/1999 |

OTHER PUBLICATIONS

Kobunshi Kagaku, vol. 29, No. 324, pp. 265-269 (Apr., 1972).
Kobunshi Ronbunshu, vol. 47, No. 4, pp. 331-337 (Apr., 1990).
Japanese Abstract No. 11 106570, dated Apr. 20, 1999.
Japanese Abstract No. 07 224189, dated Aug. 22, 1995.
Japanese Abstract No. 2000 007842 dated Jan. 11, 2000.

*Primary Examiner*—Ana Woodward
(74) *Attorney, Agent, or Firm*—Sughrue Mion, PLLC

(57) ABSTRACT

An insulating member is made of an abrasion-resistant resin composition prepared by mixing a base resin with a polyamide ultrafine, fibers-dispersed polyolefin resin composition that contains a polyolefin, polyamide fibers, a silane coupling agent and silica particles. In the resin composition, the silica particles may be in the polyamide fibers.

6 Claims, 2 Drawing Sheets

INSULATING MEMBER USING ABRASION-RESISTANT RESIN COMPOSITION

BACKGROUND OF THE INVENTION

The present invention relates to an insulating member using an abrasion-resistant resin composition. Precisely, the invention relates to such an insulating member which is usable in any severe service conditions, for example, in the inner structure of automobiles.

Polyolefin resin is widely used since it is light and easy to shape and has good mechanical strength in some degree. When the resin is desired to have higher strength and elasticity, glass fibers, talc, clay, calcium carbonate and the like may be added to it. However, the additives may detract from the workability of the resin and may increase the weight thereof and, as the case may be, they may worsen the outward appearance of shaped articles of the resin. Therefore desired is polyolefin resin that is free from the drawbacks.

For example, lightweight bicomponent fibers of polypropylene and polyamide with no interfacial separation of the constituent components are disclosed in, for example, Japanese Patent Publication Nos. 3-279419A (page 2), 4-272222A (page 2) and 4-281015A (page 2). These are core/sheath fibers, and the object disclosed is to improve the colorability of polypropylene in the fibers. The method disclosed for the fibers comprises high-speed spinning through a spinning nozzle with small orifices and treating the thus-spun fibers with solvent or melting them, and its object is to obtain ultrafine fibers having a fineness of from 0.1 to 1 denier (d). Therefore, the productivity in the method is poor, and the method is uneconomical. The fibers are continuous ultrafine fibers and are therefore good material for woven fabrics and synthetic leather that are glossy and have a good feel. However, when filled in and mixed with rubber or resin, they are difficult to knead and disperse since they are continuous fibers.

In Kobunshi Kagaku, Vol. 29, No. 324, 265 (1972), and Kobunshi Ronbunshu, Vol. 47, No. 4, 331 (1990), disclosed is a nylon/polypropylene blend with a small amount of maleic anhydride-modified polypropylene added thereto. In this, the compatibility of the two constituent components with each other is improved, and the particle size of the dispersion particles is extremely reduced to improve the mechanical properties (impact resistance, tensile strength) of the polymer blend. However, the mechanical properties of the polymer blend having a blend ratio of around 50/50 are extremely poor. A composition of polyamide fibers finely dispersed in a polyolefin matrix is disclosed in, for example, Japanese Patent Publication No. 11-106570A (page 1). This composition is hopeful as a reinforcing material for rubber and resin, and when a polyolefin is added thereto, the workability, the strength and the elasticity of the resulting composition are enhanced.

Japanese Patent Publication No. 11-302464A (page 1) discloses a composition that contains from 90 to 99 parts by weight of a polyolefin and from 1 to 10 parts by weight of polyamide fibers. This composition has good shaping workability and is lightweight, and its strength, elasticity and dimensional stability are all good. However, the composition disclosed in this publication is not improved in point of the abrasion resistance thereof.

On the other hand, for example, various resinous insulating members are used in the inner structure of automobiles. The inner structure of automobiles that comprises such insulating members is all the time in severe conditions, for example, exposed to high temperature, shock, vibration, and scattering of oily matter such as oil and fuel.

Heretofore, various resinous insulating members have been used for automobile parts in different sites to satisfy different heat resistance, oil resistance, impact resistance, abrasion resistance and dimensional stability. For these, for example, used are various resins and rubbers such as polyvinyl chloride (PVC), polyethylene (PE), polypropylene (PP), Teflon (trademark), polyethylene terephthalate (PET), nylon (PA), ethylene-ethyl acrylate copolymer (EEA), ethylene-vinyl acetate copolymer (EVA), polyether-sulfone (PES), polyimide, polyphenylene sulfide (PPS), polyether-nitrile (PEN), olefin-based elastomer, styrene-based elastomer, polybutylene terephthalate (PBT), nylon 6 (PA6), nylon 66 (PA66), nylon 46 (PA46), nylon 6T (PA6T; HPA), polyphenylene ether (PPE), polyoxymethylene (POM), polyarylate (PAR), polyetherimide (PEI), liquid-crystalline polymer (LCP), cyclic olefin copolymer (COC), polymethylpentene (PMP), PP alloy, PA66 alloy, polycarbonate (PC), acryl, silicone, ethylene-propylene-diene tercopolymer (EPDM), chloroprene, urethane, polyethylene chloride, nitrile and nitrile rubber (NBR). Optionally two or more different types of these resins and rubbers may be combined. The applications of these resinous materials are specifically defined depending on their own intrinsic characteristics. However, when the resinous materials are used only directly as they are, they are not satisfactorily resistant to the severe conditions as in the inner structure of automobiles.

Resinous insulating members to be in the inner structure of automobiles are differentiated by coloration in prescribed colors (red, white, black, blue, green, etc.) for easy construction, wiring and interconnection of the parts. For coloring wires, heretofore employed is a method of kneading dye or pigment in insulating resin while the resin is shaped through extrusion, in which the coating layer of the resin is homogeneously colored to the depth thereof. However, the method is problematic in that the line must be stopped every time for color change and the material loss is therefore great. This means that the productivity in the method is not good and the colored wires of not so much use will be much in stock.

SUMMARY OF THE INVENTION

It is therefore an object of the invention to provide an insulating member which has an improved abrasion resistance over the single use of individual resins depending on the characteristics intrinsic to the individual resins, so as to have good impact resistance and dimensional stability and are usable even in any severe service conditions, for example, in the inner structure of automobiles, and so as to have good colorability.

In order to achieve the above object, according to the invention, there is provided an insulating member, comprised of an abrasion-resistant resin composition prepared by mixing a base resin with a polyamide ultrafine fibers-dispersed polyolefin resin composition comprised of a polyolefin, polyamide fibers, a silane coupling agent and silica particles. Preferably, the polyamide fibers are comprised of the silica particles.

Preferably, the content of the silica particles falls within a range from 1 to 100 parts by weight relative to 100 parts by weight of the polyolefin therein.

Prefreably, a blend ratio of the polyolefin to the polyamide fibers in the, polyamide ultrafine fibers-dispersed polyolefin resin composition falls within a range from 5:5 to 9:1 (polyolefin:polyamide). Here, it is preferable that the blend ratio is 8:2.

Preferably, a mean fiber diameter of the fibrously dispersed polyamide is not greater than 1 μm, and an aspect ratio thereof falls within a range from 20 to 1000.

Containing the polyamide ultrafine fibers-dispersed polyolefin resin composition that contains a polyolefin, polyamide fibers, a silane coupling agent and silica particles, the insulating member of the invention have improved abrasion resistance, flame retardancy, strength and elasticity over those of the base resin alone.

Though not clear, the mechanism of the action of the additional resin composition may be considered as shown in FIG. 1. When the mixture of polyolefin PO and polyamide PA, silane coupling agent C and silica particles S is kneaded with the base resin, then the constituent components of the mixture may receive heat history and pressure history, and, in addition to the bonding formed between the silane-modified part of the polyolefin PO with the silane coupling agent C and the hydrogen of the amido bond of the polyamide fibers PA, additional bonding of the silane-modified part of the polyolefin PO to the silica particles S may be formed.

The type of the base material to be in the insulating member of the invention may be suitably selected, and the insulating member is usable for electric wires, tapes, tubes, connector housings, fusible links, ultrasonic welding, optical connectors, junction boxes, fuse boxes, dome lamps, rubber materials, protectors, and rubber stopper grommets.

BRIEF DESCRIPTION OF THE DRAWINGS

The above objects and advantages of the present invention, will become more apparent by describing in detail preferred exemplary embodiments thereof with reference to the accompanying drawings, wherein.

DETAILED DESCRIPTION OF INVENTION

Figure 1:
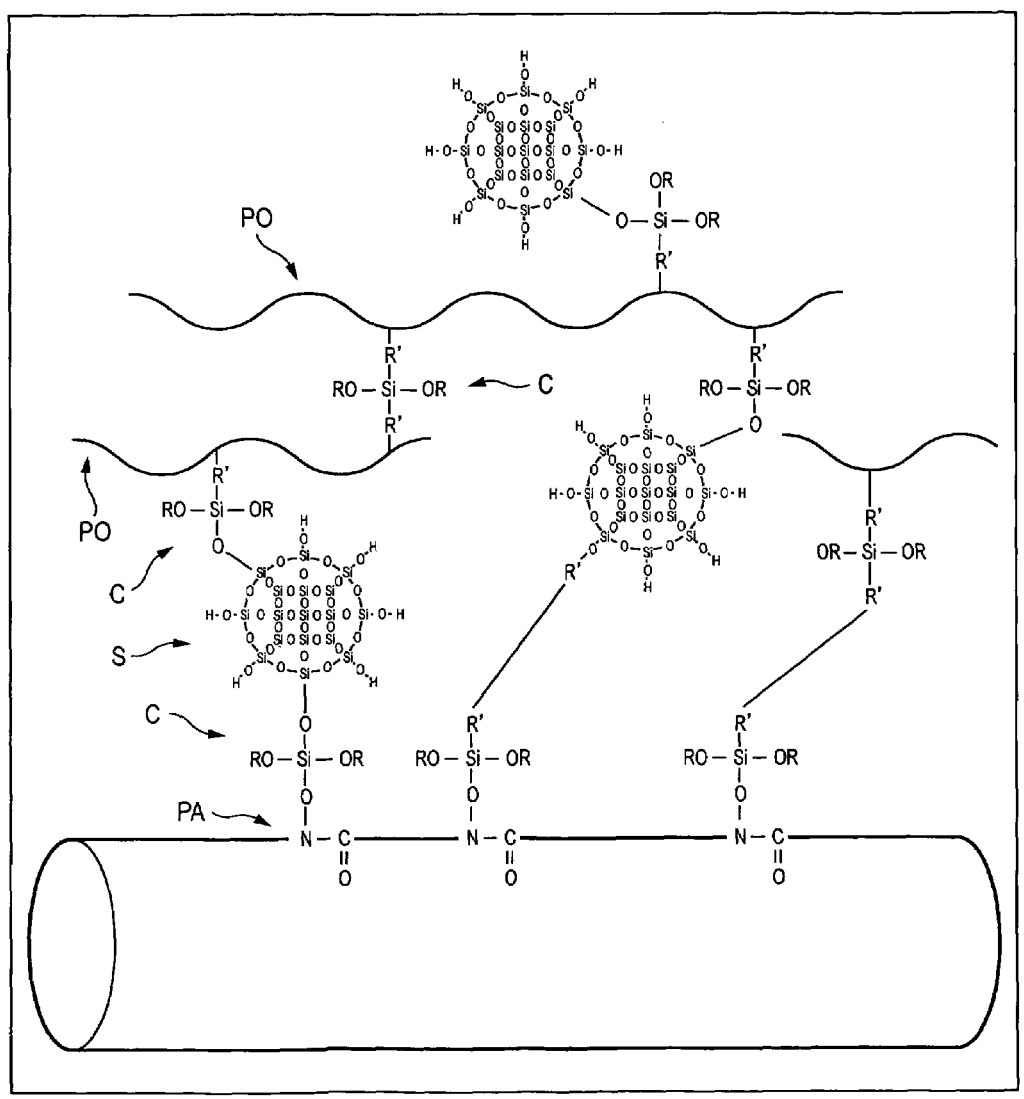
FIG. 1 is a conceptual view showing the presumed action and mechanism of a polyolefin resin composition of the invention.

Preferred embodiments of the invention will be described below in detail. According to the invention, an insulating member of the invention is formed of an abrasion-resistant resin composition prepared by mixing a base resin with a polyamide ultrafine fibers-dispersed polyolefin resin composition that contains a polyolefin, polyamide fibers, a silane coupling agent and silica particles.

Not specifically defined, the polyolefin resin to be used in the polyamide ultrafine fibers-dispersed polyolefin resin composition is preferably one having a melting point that falls between 80 and 250° C. Preferred examples of the resin of the type are a homopolymer and a copolymer of olefin having from 2 to 8 carbon atoms, a copolymer of olefin having from 2 to 8 carbon atoms with vinyl acetate, a copolymer of olefin having from 2 to 8 carbon atoms with acrylic acid or its ester, a copolymer of olefin having from 2 to 8 carbon atoms with methacrylic acid or its ester, and a copolymer of olefin having from 2 to 8 carbon atoms with a vinylsilane compound.

Specific examples of the resin are high-density polyethylene, low-density polyethylene, linear low-density polyethylene, polypropylene, ethylene/propylene block copolymer, ethylene/propylene random copolymer, poly-4-methylpentene-1, polybutene-1, polyhexene-1, ethylene/vinyl acetate copolymer, ethylene/vinyl alcohol copolymer, ethylene/acrylic add copolymer, ethylene/methyl acrylate copolymer, ethylene/ethyl acrylate copolymer, ethylene/propyl acrylate copolymer, ethylene/butyl acrylate copolymer, ethylene/2-ethylhexyl acrylate copolymer, ethylene/hydroxyethyl acrylate copolymer, ethylene/vinyltrimethoxysilane copolymer, ethylene/vinyltriethoxysilane copolymer, ethylene/vinylsilane copolymer. Also preferred for use herein are halogenopolyolefins such as polyethylene chloride, polyethylene bromide, chlorosulfonated polyethylene.

Of those, especially preferred are high-density polyethylene (HDPE), low-density polyethylene (LDPE), linear low-density polyethylene (LLDPE), polypropylene (PP), ethylene/propylene block copolymer (EPBC), ethylene/propylene random copolymer (EPRC), ethylene/vinyl acetate copolymer (EVA), ethylene/ethyl acrylate copolymer (EEA), and ethylene/vinyl alcohol copolymer; and most preferred are those having a melt flow index (MFI) that falls between 0.2 and 50 g/10 min. One or more of these may be used herein either singly or as combined.

Also not specifically defined, the polyamide to be used in the polyamide ultrafine fibers-dispersed polyolefin resin composition is a thermoplastic polyamide having an amide group in the backbone chain thereof (this is hereinafter referred to as "polyamide") and having a melting point that falls between 135 and 350° C. and is higher by at least 20° C. than the melting point of the polyolefin. Preferably, the polyamide has a melting point falling between 160 and 265° C. Also preferably, the polyamide of the type may give tough fibers through extrusion and stretching.

Specific examples of the polyamide are nylon 6, nylon 66, nylon 6-nylon 66 copolymer, nylon 610, nylon 46, nylon 11, nylon 12, nylon MXD6, xylylenediamine/adipic acid polycondensate, xylylenediamine/pimelic acid polycondensate, xylylenediamine/suberic acid polycondensate, xylylenediamine/azelaic acid polycondensate, xylylenediamine/sebacic acid polycondensate, tetramethylenediamine/terephthalic acid polycondensate, hexamethylenediamine/terephthalic acid polycondensate, octamethylenediamine/terephthalic acid polycondensate, trimethylhexamethylenediamine/terephthalic acid polycondensate, decamethylenediamine/terephthalic acid polycondensate, undecamethylenediamine/terephthalic acid polycondensate, dodecamethylenediamine/terephthalic acid polycondensate, tetramethylenediamine/isophthalic acid polycondensate, hexamethylenediamine/isophthalic acid polycondensate, octamethylenediamine/isophthalic acid polycondensate, trimethylhexamethylenediamine/isophthalic acid polycondensate, decamethylenediamine/isophthalic acid polycondensate, undecamethylenediamine/isophthalic acid polycondensate, and dodecamethylenediamine/isophthalic acid polycondensate.

Of those polyamides, especially preferred examples are nylon 6 (PA6), nylon 66 (PA66), nylon 12 (PA12), nylon 6-nylon 66 copolymer. One or more of these may be used herein. Preferably, these polyamides have a molecular weight falling between 10,000 and 200,000.

The silane coupling agent to be used in the polyamide ultrafine fibers-dispersed polyolefin resin composition is not specifically defined. Its specific examples are vinyltrimethoxysilane, vinyltriethoxysilane, vinyltris(β-methoxyethoxy)silane, vinyltriacetylsilane, γ-methacryloxypropyltrimethoxysilane, β-(3,4-epoxycyclohexyl)ethyltrimethoxysilane, γ-glycidoxypropyltrimethoxysilane, γ-glycidoxypropylmethyidimethoxysilane, γ-glycidoxypropylmethyidiethoxysilane, γ-glycidoxypropylethyldimethoxysilane, γ-glycidoxypropylethyidiethoxysilane, N-β-(aminoethyl)aminopropyltrimethoxysilane, N-β-(aminoethyl)aminopropyltriethoxysilane, N-β-(aminoethyl)aminopropylmethyldimethoxysilane, N-β-(aminoethyl)aminopropylethyidimethoxysilane, N-β-(aminoethyl) aminopropylathyidiethoxysilane, N-β-(aminoethyl) aminopropylethyldiethoxysilane, γ-aminopropyltiethoxysilane, N-phenyl-γ-aminopropyltrimethoxysilane, γ-[N-(β-methacryloxyethyl)-N,N-dimethylammonium (chloride)]propylmethoxysilane, and styryldiaminosilane. Of the above, especially preferred are those having a group that is readily leaved by taking the hydrogen atom from an alkoxy group and/or a polar group, and a vinyl group.

The amount of the silane coupling agent to be in the composition is preferably from 0.1 to 5:5 parts by weight, more preferably from 0.2 to 3.0 parts by weight relative to 100 parts by weight of the total of the polyolefin component and the polyamide component therein (when silica is mixed with the components all at a time, the amount of the silane coupling agent may be from 0.1 to 8.0 parts by weight, preferably from 0.2 to 4.0 parts by weight; but when silica is added later to the resin composition, then the amount of the silane coupling agent may be from 0.1 to 5:5 parts by weight and the silica may be processed for silane coupling). If the amount of the silane coupling agent is less than 0.1 parts by weight, then the abrasion resistance, the flame retardancy and the strength of the composition could not be high; but if the amount of the silane coupling agent is greater than 5:5 parts by weight, then the elasticity of the composition could not be high. If the amount of the silane coupling agent is less than 0.1 parts by weight, then a firm bond could not be formed between the polyolefin component, the polyamide component and the silica particles, and the strength of the composition could not be high. On the other hand, if the amount of the silane coupling agent is greater than 5:5 parts by weight, then the polyamide component could not form good fine fibers and the elasticity of the composition will be therefore poor.

An organic peroxide may be used together with the silane coupling agent. When an organic peroxide is used together with it, then radicals may be formed in the molecular chains of the polyolefin component and they may react with the silane coupling agent to promote the reaction of the polyolefin component and the silane coupling agent. The amount of the organic peroxide to be used may be from 0.01 to 1.0 part by weight relative to 100 parts by weight of the polyolefin component. Preferably, the temperature for the half-life period for one minute of the organic peroxide is the same as the higher one of the melting point of the polyolefin component or the melting point of the silane coupling agent or is higher by around 30° C. than that temperature. Concretely, the temperature for the half-life period for one minute of the organic peroxide preferably falls between 110 and 200° C. or so.

Specific examples of the organic peroxide are di-α-cumyl peroxide, 1,1-di-t-butylperoxy-3,3,5-trimethylcyclohexane, 1,1-di-t-butylperoxycyclohexane, 2,2-di-t-butylperoxybutane, n-butyl 4,4-di-t-butylperoxyvalerate, 2,2-bis(4,4-di-t-butylperoxycyclohexane)propane, 2,2,4-trimethylpentylperoxy neodecanoate, α-cumylperoxy neodecanoate, t-butylperoxy neohexanoate, t-butylperoxy pivalate, t-butylperoxy acetate, t-butylperoxy laurate, t-butylperoxy benzoate, t-butylperoxy isophthalate. Above all, preferred are those of which the temperature for the half-life period for one minute falls between a temperature at which the components are melt-kneaded and a temperature higher by around 30° C. than the melt-kneading temperature, concretely the temperature for the half-life period for one minute thereof preferably falls between 80 and 260° C., approximately.

The silica particles to be used in the polyamide ultrafine fibers-dispersed polyolefin resin composition (including those processed with coupling agent, those formed through CVD and those subjected to surface treatment with surface-treating agent) are not specifically defined. Preferably, their particle size falls between 1 nm and 100 μm, more preferably between 1 nm and 100 nm.

Also not specifically defined, the content of the silica particles to be in the polyamide ultrafine fibers-dispersed polyolefin resin composition is preferably from 1 to 100 parts by weight, more preferably from 1 to 60 parts by weight relative to 100 parts by weight of the polyolefin resin composition.

If the amount is greater than 60 parts by weight, the strength of the composition could not high.

If, on the other hand, the amount is less than 1 part by weight, the hydrogen bond part between the silane coupling agent and the silica particles will be unsatisfactory and the composition could not also have the intended abrasion resistance and strength.

In fact, however, the preferred amount of the silica particles varies depending on the kneading condition in preparing the polyolefin resin composition of the invention, and therefore it may be suitably determined before the constituent components are kneaded.

Almost all of the polyamide component in the polyamide ultrafine fibers-dispersed polyolefin resin composition forms fine fibers that are uniformly dispersed in the matrix of the composition. Concretely, at least 70% by weight, preferably at least 80% by weight, more preferably at least 90% by weight of the polyamide component forms fine fibers that are uniformly dispersed in the matrix. Preferably, the mean fiber diameter of the polyamide component fibers is at most 1 μm, and the mean fiber length thereof is at most 100 μm. Also preferably, the aspect ratio (ratio of fiber length/fiber diameter) of the fibers falls between 20 and 1,000. The polyolefin component bonds to the polyamide component at their interface.

Though not specifically defined, the blend ratio of the polyolefin component to the polyamide component in the polyamide ultrafine, fibers-dispersed polyolefin resin composition preferably falls between 5:5 and 9:1 (polyolefin:polyamide) and is more preferably 8:2 (polyolefin:polyamide).

If the blend ratio of the polyolefin component is less than 5, it is unfavorable since the elongation of the composition will lower. If the blend ratio of the polyamide component is less than 1, the elasticity and the strength of the composition could not be high, but if greater than 5, the elongation of the shaped articles of the composition will be poor.

Next described is a method for producing the polyamide ultrafine fibers-dispersed polyolefin resin composition.

The method for producing the polyamide ultrafine fibers-dispersed polyolefin resin composition includes the following two ways.
(A) A resin composition that comprises a polyolefin, polyamide fibers and a silane coupling agent is previously prepared and this is kneaded with silica particles.
(B) A polyolefin, a polyamide, a silane coupling agent and silica particles are kneaded.

Though not specifically defined, the method for preparing the resin composition that comprises a polyolefin, polyamide fibers and a silane coupling agent in the mode (A) comprises, for example, the following steps:

(A1) melt-kneading a polyolefin (component 1) and a silane coupling agent (component 2) to chemically modify the component 1;

(A2) melt-kneading a polyamide (component 3) with the component 1 that has been chemically modified with the component 2, at a temperature not lower than the melting point of the component 3;

(A3) melt-kneading, chemically modifying and extruding the polyamide component 3 with the component 1 that has been chemically modified with the component 2 at a temperature not lower than the melting point of the component 3;

(A4) stretching or rolling the melt-kneaded and chemically-modified extrudate at a temperature not lower than the melting point of the component 1 but not higher than the melting point of the component 3 with drafting it;

(A5) cooling the stretched or rolled composition to room temperature and pelletizing it; and (A6) optionally adding a remaining polyolefin component 1 to the pellets, and further melt-kneading it at a temperature not higher than the melting point of the component 3, cooling and pelletizing it.

Step (A1) will be described below. The melt-kneading temperature is not lower than the melting point of the component 1, but preferably higher by 30° C. than the melting point. When the two are melt-kneaded at a temperature higher by 30° C. than the melting point of the component 1, then the component 1 reacts with the component 2 and is chemically modified by the component 2. Melt-kneading them may be effected in any ordinary device generally used for kneading resin or rubber. The device includes, for example, Banbury mixer, kneader, kneader extruder, open roll, single-screw kneader, double-screw kneader. Of those devices, most preferred is a double-screw kneader as it may achieve continuous melt-kneading within a short period of time (the same shall apply to the steps mentioned below).

Step (A2) will be described below. The melt-kneading temperature is not lower than the melting point of the component 3, but preferably higher by 10° C. than the melting point. If the melt-kneading temperature is lower than the melting point of the component 3, the components could not be kneaded and could not be fibrously dispersed. Therefore, they are melt-kneaded at a temperature higher than the melting pint, especially preferably higher by 20° C. than the melting point of the component 3.

Step (A3) will be described below. The kneaded mixture obtained in the step is extruded out through a spinneret or through an inflation die or T-die. Spinning and extruding the mixture must be effected at a temperature higher than the melting point of the component 3. Concretely, it is desirable that the operation is effected at a temperature higher by 30° C. than the melting point of the component 3. Even when the operation of melt-kneading the mixture is effected at a temperature lower than the melting point of the component 3, the kneaded mixture could not have a structure of fine fibers of the component 3 dispersed in the matrix of the component 1. Accordingly, even when the kneaded mixture of the type is spun and stretched, the component 3 could not form fine fibers.

Step (A4) will be described below. The extruded, string-like or yarn-like product is continuously cooled, stretched or rolled. Cooling the fibrous product followed by stretching or rolling it is effected at a temperature lower by 10° C. than the melting point of the component 3. Stretching and rolling it gives tougher fibers, and the treatment is favorable since the fiber-reinforced resin composition thus produced may have better properties. The stretching or rolling treatment may be effect d, for example, by extruding the kneaded mixture through a spinneret to spin it into a string-like or yarn-like product, followed by winding it around a bobbin with drafting. If desired, it may be pelletized into pellets. Drafting the fibrous product as referred to herein means that the winding-up speed of the product is higher than the speed thereof that passes through a spinneret. Preferably, the ratio of winding-up speed/spinneret speed (draft ratio) falls between 1.5 and 100, more preferably between 2 and 50, even more preferably between 3 and 30.

Step (A5) will be described below. The polyamide fiber-reinforced polyolefin resin composition is preferably in the form of pellets since any additional resin or rubber component may be added to and uniformly kneaded with them. The pelletized resin composition may be uniformly kneaded with such additional rubber or resin, and it may readily give a polyamide fiber-reinforced resin composition with fine fibers uniformly dispersed therein.

Though described separately hereinabove, the respective steps may be combined into one continuous process to be effected in a double-screw kneader having a plurality of supply ports each feeding one of the respective components and a peroxide or the like into the kneader and having a plurality of kneading zones each correspond to one of the supply ports. Comprising the thus-combined steps, the process is more economical, stable and safe.

The method of kneading the resin composition that comprises a polyolefin, polyamide fibers and a silane coupling agent, with silica particles is not specifically defined. For example, pellets of the resin composition that comprises a polyolefin, polyamide fibers and a silane coupling agent (component 4) may be thermally kneaded with silica particles (component 5) in a Banbury mixer, kneader, kneader extruder, open roll, single-screw kneader or double-screw kneader, at a temperature higher by 10° C. than the melting point of polyolefin but not higher than the melting point of polyamide.

It is presumed that a hydrogen bond may be formed between the component 5 and the silane coupling agent in the component 4 through the thermal kneading operation as above. The thermally-kneaded mixture is preferably extruded, stretched or rolled, and pelletized.

The method of producing the resin composition that comprises a polyolefin, polyamide fibers, a silane coupling agent and silica particles in the production mode (B) is not specifically defined. For example, it comprises the following steps:

(B1) melt-kneading a polyolefin (component 1) with a silane coupling (component 2) and silica particles (component 5) to chemically modify the component 1;

(B2) melt-kneading a polyamide (component 3) with the component 1 that has been chemically modified with the component 2, at a temperature not lower than the melting point of the component 3;

(B3) melt-kneading, chemically modifying and extruding the polyamide component 3 with the component 1 that has been chemically modified with the component 2 at a temperature not lower than the melting point of the component 3;

(B4) stretching or rolling the melt-kneaded and chemically-modified extrudate at a temperature not lower than the melting point of the component 1 but not higher than the melting point of the component 3 with drafting it;

(B5) cooling the stretched or rolled composition to room temperature and pelletizing it; and (B6) optionally adding a remaining polyolefin component 1 to the pellets, and further melt-kneading it at a temperature not higher than the melting point of the component 3, cooling and pelletizing it.

Step (B1) will be described below. The melt-kneading temperature is not lower than the melting point of the component 1, but preferably higher by 30° C. than the melting point When the components are melt-kneaded at a temperature higher by 30° C. than the melting point of the component 1, then the component 1 reacts with the component 2 and is chemically modified by the component 2. Melt-kneading them may be effected in any ordinary device generally used for kneading resin or rubber. The device includes, for example, Banbury mixer, kneader, kneader extruder, open roll, single-screw kneader, double-screw kneader. Of those devices, most preferred is a double-screw kneader as it may achieve continuous melt-kneading within a short period of time (the same shall apply to the steps mentioned below).

Step (B2) will be described below. The melt-kneading temperature is not lower than the melting point of the component 3, but preferably higher by 10° C. than the melting point. If the melt-kneading temperature is lower than the melting point of the component 3, the components could not be kneaded and could not be fibrously dispersed. Therefore, they are melt-kneaded at a temperature higher than the melting pint, especially preferably higher by 20° C. than the melting point of the component 3.

Step (B3) will be described below. The kneaded mixture obtained in the step is extruded out through a spinneret or through an inflation die or T-die. Spinning and extruding the mixture must be effected at a temperature higher than the melting point of the component 3. Concretely, it is desirable that the operation is effected at a temperature higher by 30° C. than the melting point of the component 3. Even when the operation of melt-kneading the mixture is effected at a temperature lower than the melting point of the component 3, the, kneaded mixture could not have a structure of fine fibers of the component 3 dispersed in the matrix of the component 1. Accordingly, even when the kneaded mixture of the type is spun and stretched, the component 3 could not form fine fibers.

Step (B4) will be described below, The extruded, string-like or yarn-like product is continuously cooled, stretched or rolled. Cooling the fibrous product followed by stretching or rolling it is effected at a temperature lower by 10° C. than the melting point of the component 3. Stretching and rolling it gives tougher fibers, and the treatment is favorable since the fiber-reinforced resin composition thus produced may have better properties. The stretching or rolling treatment may be effected, for example, by extruding the kneaded mixture through a spinneret to spin it into a string-like or yarn-like product, followed by winding it around a bobbin with drafting. If desired, it may be pelletized into pellets. Drafting the fibrous product as referred to herein means that the winding-up speed of the product is higher than the speed thereof that passes through a spinneret. Preferably, the ratio of winding-up speed/spinneret speed (draft ratio) falls between 1.5 and 100, more preferably between 2 and 50, even more preferably between 3 and 30.

Step (B5) will be described below. The polyamide fiber-reinforced polyolefin resin composition is preferably in the form of pellets since any additional resin or rubber component may be added to and uniformly kneaded with them. The pelletized resin composition may be uniformly kneaded with such additional rubber or resin, and it may readily give a polyamide fiber-reinforced resin composition with fine fibers uniformly dispersed therein.

Though described separately hereinabove, the respective steps may be combined into one continuous process to be effected in a double-screw kneader having a plurality of supply ports each feeding one of the respective components and a peroxide or the like into the kneader and having a plurality of kneading zones each corresponding to one of the supply ports. Comprising the thus-combined steps, the process is more economical, stable and safe.

Thermally kneaded in the manner as above, the component 1 reacts with the component 2 and is thereby chemically modified with the latter, and fine fibers of the component 3 are dispersed in the matrix of the component 1. As the case may be, whisker fibers of the component 1 that are finer than the fine fibers of the component 3 may be formed on the surfaces of the fibers of the component 3. In this embodiment, the component 3 is also modified with the component 2. It is presumed that the component 5 may chemically bond to the component 1 and the component 3 at their parts that have been chemically modified with the component 2 to thereby partially crosslink the component 1 and the component 3. The gel fraction of this embodiment with the component 5 added thereto is higher than that of the other case not containing the component 5. To that effect, the component 5 improve various properties of the resin composition.

Apart from the above components, the polyamide ultrafine fibers-dispersed polyolefin resin composition may contain any of various auxiliary agents such as carbon black, white carbon, activated calcium carbonate, ultrafine particles of magnesium silicate, magnesium hydroxide, ferrite, zeolite, high-styrene resin, phenolic resin, lignin, modified melamine resin, chroman-indene resin, petroleum resin; various fillers; such as calcium, carbonate, basic magnesium carbonate, clay, talc, mica, zinc flower, montmorillonite, wollastonite, barium sulfate; various stabilizers of, for example, amine-aldehydes, amine-ketones, amines, phenols, imidazoles, sulfur-containing antioxidants, phosphorus-containing antioxidants; and various pigments.

The base resin for the insulating member of the invention is not specifically defined and may be suitably selected depending on the use of the insulating member. For example, it includes polyvinyl chloride (PVC), polyethylene (PE), polypropylene (PP), Teflon (trademark), polyethylene terephthalate (PET), nylon (PA), ethylene-ethyl acrylate copolymer (EEA), ethylene-vinyl acetate copolymer (EVA), polyether-sulfone (PES), polyimide, polyphenylene sulfide (PPS), polyether-nitrile (PEN), olefin-based elastomer, styrene-based elastomer, polybutylene terephthalate (PBT), nylon 6 (PA6), nylon 66 (PA66), nylon 46 (PA46), nylon 6T (PA6T; HPA), polyphenylene ether (PPE), polyoxymethylene (POM), polyarylate (PAR), polyetherimide (PEI), liquid-crystalline polymer (LCP), cyclic olefin copolymer (COC), polymethylpentene (PMP), PP alloy, PA66 alloy, polycarbonate (PC), acryl, silicone, ethylene-propylene-diene tercopolymer (EPDM), chloroprene, urethane, polyethylene chloride, nitrile and nitrile rubber (NBR). Optionally two or more different types of these resins and rubbers may be combined for the base resin.

The form of the insulating member of the invention is not specifically defined. For example, it includes electric wires, tapes, tubes, connector housings, fusible links, ultrasonic welding, optical connectors, junction boxes, fuse boxes, dome lamps, rubber materials, protectors, and rubber stopper, grommets.

Regarding the details of the base resin suitable for the insulating member of these forms, PVC, PE, PP, Teflon (trademark), PET, PA EEA, EVA, PES, polyimide, PPS, PEN, olefin-based elastomer, styrene-based elastomer and resin mixtures of two or more of these may be used for electric wires, tapes and tubes; PBT, PA6, PA66, PA46, PP, PA6T, PPE and POM may be used for connectors; PA6T, PES and PAR may be used for FL; PEI may be used for ultrasonic welding; LCP, COC and PMP may be used for optical connectors; PP, PA66 PP+talc, PPE+PP alloy, PPE+PA66 alloy, PET and PPS may be used for boxes; PC and acryl may be used for dome lamps; silicone, EPDM, chloroprene, urethane, polyethylene chloride, and nitrile may be used for rubber materials; PP may be used for protectors; and EPDM, NBR and silicone may be used for rubber stopper grommets.

The invention is described with reference to numeric examples. However, the invention is not limited thereto.

In the following examples and comparative examples, the physical properties of the polyolefin resin composition were measured in the manner mentioned below.

Gel Fraction:

The resin composition was put into a stainless mesh container, and dipped in xylene at 120° C. for 24 hours, and then its weight was measured and expressed as percentage relative to the weight of the non-dipped resin composition.

Fiber Form in Point of Morphology, Dispersibility and Mean Fiber Diameter:

The resin composition was dissolved in xylene, and its fibrous part, was taken out of it and then washed. This was observed with a scanning electronic microscope. When fine fibers were dispersed, the dispersibility of the sample was good. When fine fibers or filmy fibers were aggregated, the dispersibility of the sample was not good. In the sample of good dispersibility, 200 fine dispersed fibers were observed with the scanning electronic microscope to determine the fiber diameter. The data were averaged to obtain the mean fiber diameter of the sample.

Tensile Strength, Tensile Elasticity, Elongation:

The tensile strength, the tensile elasticity and the elongation of the resin composition were measured according to ASTM D638, at a temperature of 23° C. The pulling speed was 50 mm/min.

Flame Retardancy:

The oxygen index at 23° C. of the resin composition was obtained according to JIS K7201-2. The type of the test piece was IV (length; 80 to 150 mm, width: 6.5±0.5 mm, thickness: 3±0.25 mm). For sample ignition, employed was method A (upper edge surface ignition).

Figure 2A:
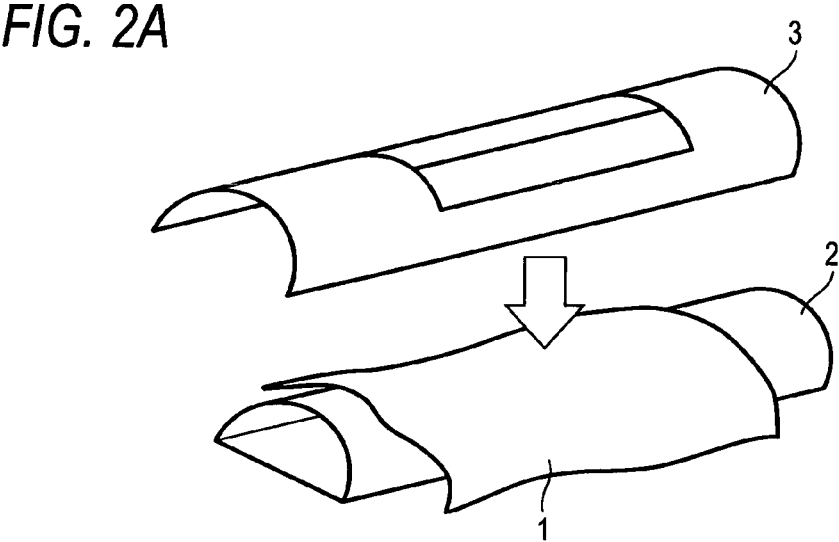
FIGS. 2A to 2C are schematic views showing a method of evaluating the abrasion resistance in examples including the polyorefin resin composition of the invention.
Figure 2B:
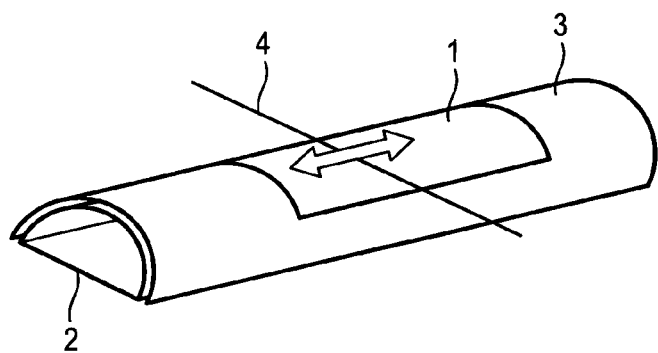
Figure 2C:
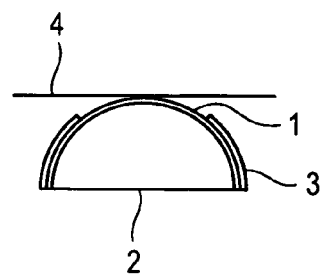

Abrasion Resistance (Scrape Resistance):

As in FIG. 2A, a sample sheet 1 (shaped to have a thickness of 0.3 mm) was put on a lower sheet fixture 2, and an upper sheet fixture 3 was put on the lower sheet fixture 2 to fix the sample sheet 1 thereon. Thus fixed, the sample sheet exposed out through the window of the upper fixture 3 was processed in the manner mentioned below.
1) A piano wire 4 (φ0.45±0.01 mm) was fitted to the sample sheet 1 in the direction perpendicular to the longitudinal direction of the sheet fixtures, as shown in FIG. 2C.
2) The piano wire 4 was moved at 5:5±5 cycles/min (one cycle is one reciprocative motion) as shown in FIG. 2B.
3) A load of 7±0.05 N was applied to the moving piano wire 4.
4) The abrasion length was 15 mm. The number of the reciprocative motions of the piano wire 4 that had first reached the lower part of the fixture was counted. The piano wire 4 is exchanged for a fresh one in every test. One sample was tested three times, and the minimum value in the three tests was the abrasion resistance value of the sample tested.

EXAMPLE 1

100 parts by weight of a polyolefin (component 1), low-density polyethylene [Ube Industries, Ltd.; F522 having a melting point of 110° C. and MFR of 5.0 (g/10 min)] was mixed with 1.0 part by weight of a silane coupling agent (component 2), γ-methacryloxypropyltrimethoxysilane, 0.5 parts by weight of an antioxidant, Irganox 1010, and 0.5 parts by weight of a peroxide, di-α-cumyl peroxide (concentration 40%), and put into a φ45 mm double-screw extruder heated at 170° C., kneaded therein and pelletized through it to give silane-modified polyethylene pellets.

All the thus-obtained silane-modified polyethylene pellets, along with 50 parts by weight of a polyamide (component 3), nylon 6 (Ube Industries, Ltd.; 1030B having a melting point of from 215 to 225° C.) and 0.5 parts by weight of Irganox 1010, were put into a double-screw extruder equipped with a 3 mmφ dice and set at 235° C., kneaded therein, and extruded out through the dice into strands, which were then cooled in air, taken up with a take-up roll at a draft ratio of 7, stretched by 1.5 times between 5-inch rolls at room temperature, and pelletized.

The pellets had a diameter of 1 mm and a length of 3 mm. The pellets were processed in hot toluene to dissolve polyethylene. The insoluble matter did not cling to the stirring blades, and the suspension was uniform. Observed with a scanning electronic microscope, the insoluble matter formed fine fibers having a diameter of 0.3 μm.

All the pellets prepared in the above were mixed with 10 parts by weight of silica particles (component 5; Nippon Aerosil Co.,; Aerosil R972 having a particle size of 16 nm, and put into a two-roll mill heated at 140° C.), kneaded therein, extruded out to give a sheet, and pelletized with a pelletizer into pellets of polyolefin resin composition.

EXAMPLES 2 TO 5

Polyolefin resin compositions were produced in the same manner as in Example 1, for which, however, the blend ratio of the component 1 to the component 3 was varied as in Table 1 below.

EXAMPLE 6

All the silane-modified polyethylene that had been prepared in the same manner as in Example 1 was mixed with 10 parts by weight of a component 5, the same silica particles as in Example 1, and put into a two-roll mill heated at 140° C., kneaded therein, and pelletized to give a silica particles-dispersed polyolefin resin composition.

In the same manner as in Example 1, the silica particles-dispersed polyolefin resin composition prepared in the above was, along with 20 parts by weight of the same component 3 as in Example 1 and 0.5 parts by weight of Irganox 1010, put into a double-screw extruder equipped with a 3 mmφ dice and set at 235° C., kneaded therein, and extruded out through the dice into strands, which were then cooled in air, taken up with a take-up roll at a draft ratio of 7, stretched by 1.5 times between 5-inch rolls at room temperature, and pelletized to obtain a polyolefin resin composition.

EXAMPLE 7

In the same manner as in Formulation Example 1, all the silane-modified polyethylene that had been prepared in the same manner as in Example 1 was, along with 10 parts by weight of the same silica particles (component 5) as in Example 1, 20 parts by weight of the same component 3 as in Example 1 and 0.5 parts by weight of Irganox, put into a double-screw extruder equipped with a 3 mm$\phi$ dice and set at 235° C., kneaded therein, and extruded out through the dice into strands, which were then cooled in air, taken up with a take-up roll at a draft ratio of 7, stretched by 1.5 times between 5-inch rolls at room temperature, and pelletized to obtain a polyolefin resin composition.

EXAMPLES 8 TO 10

Polyolefin resin compositions were produced in the same manner as in Example 4, for which, however, the amount of the component 5, the same silica particles as in Example 1 was varied as in Table 1 below.

EXAMPLES 11 AND 12

A polyolefin resin composition was produced in the same manner as in Examples 3 and 4, to which, however, the component 5, the same silica particles as in Example 1 was not added.

The polyolefin resin composition pellets thus obtained according to the formulation as above were kneaded in a kneader, Brabender Plastograph heated at 150° C., for 5 minutes, and pressed at 120° C. into sheets having a thickness of 2 mm. The sheets were tested for their tensile strength.

The constituent components and the characteristic data of Examples 1 to 12 are shown in Table 1 below. In the table, Examples 11 and 12 are comparative examples.

TABLE 1

| | example No. | | | |
|---|---|---|---|---|
| | 1 | 2 | 3 | 4 |
| blend ratio | | | | |
| polyolefin:polyamide | 5:5 | 6:4 | 7:3 | 8:2 |
| silica particles (wt. pts.) | 10 | 10 | 10 | 10 |
| when silica particles are added | after | after | after | after |
| characteristic value | | | | |
| fiber dispersibility | good | good | good | good |
| mean fiber diameter (μm) | 1 | 1 | 1 | 1 |
| gel fraction (%) | 63 | 53 | 42 | 19 |
| frame retardancy (oxygen index) | 20.7 | 20.4 | 20.1 | 19.7 |
| tensile strength (MPa) | 28 | 28 | 29 | 20 |
| elongation (%) | 21 | 30 | 41 | 80 |
| abrasion resistance (number of cycles) | 380 | 300 | 260 | 240 |

TABLE 1-continued

| | example No. | | | |
|---|---|---|---|---|
| | 5 | 6 | 7 | 8 |
| blend ratio | | | | |
| polyolefin:polyamide | 9:1 | 8:2 | 8:2 | 8:2 |
| silica particles (wt. pts.) | 10 | 10 | 10 | 30 |
| when silica particles are added | before | before | same time | after |
| characteristic value | | | | |
| fiber dispersibility | good | good | good | good |
| mean fiber diameter (μm) | 1 | 2 | 2 | 1 |
| gel fraction (%) | 23 | 30 | 29 | 44 |
| frame retardancy (oxygen index) | 19.0 | 19.7 | 19.6 | 19.9 |
| tensile strength (MPa) | 18 | 21 | 21 | 19 |
| elongation (%) | 120 | 86 | 83 | 31 |
| abrasion resistance (number of cycles) | 210 | 243 | 230 | 310 |

| | example No. | | | |
|---|---|---|---|---|
| | 9 | 10 | 11 | 12 |
| blend ratio | | | | |
| polyolefin:polyamide | 8:2 | 8:2 | 8:2 | 7:3 |
| silica particles (wt. pts) | 60 | 100 | 0 | 0 |
| when silica particles are added | after | after | | |
| characteristic value | | | | |
| fiber dispersibility | good | good | good | good |
| mean fiber diameter (μm) | 1 | 1 | 1 | 1 |
| gel fraction (%) | 52 | 62 | 23 | 35 |
| frame retardancy (oxygen index) | 20.6 | 21.8 | 19.2 | 19.6 |
| tensile strength (MPa) | 20 | 22 | 19 | 28 |
| elongation (%) | 10 | 8 | 80 | 40 |
| abrasion resistance (number of cycles) | 420 | 480 | 60 | 80 |

As in Table 1 above, the polyolefin resin compositions that contain a polyolefin, polyamide fibers, a silane coupling agent and silica particles have a higher gel fraction than those not containing any of them, and it is expected that the former compositions have good abrasion resistance and have improved flame retardancy, strength and elasticity.

What is claimed is:

1. An insulating member, comprised of an abrasion-resistant resin composition prepared by mixing a base resin with a polyamide ultrafine fibers-dispersed polyolefin resin composition comprised of a polyolefin, polyamide fibers, a silane coupling agent and silica particles.

2. The insulating member as set forth in claim 1, wherein the polyamide fibers are comprised of the silica particles.

3. The insulating member as set forth in claim 1, wherein the content of the silica particles falls within the range from 1 to 100 parts by weight relative to 100 parts by weight of the polyolefin therein.

4. The insulating member as set forth in claim 1, wherein the blend ratio of the polyolefin to the polyamide fibers in the polyamide ultrafine fibers-dispersed polyolefin resin composition falls within the range from 5:5 to 9:1 (polyolefin:polyamide).

5. The insulating member as set forth in claim 4, wherein the blend ratio is 8:2.

6. The insulating member as set forth in claim 1, wherein the mean fiber diameter of the fibrously dispersed polyamide is not greater than 1 μm, and the aspect ratio thereof falls within the range from 20 to 1000.

* * * * *